(12) United States Patent
Boe et al.

(10) Patent No.: US 10,867,766 B2
(45) Date of Patent: Dec. 15, 2020

(54) SUBSEA FUSE DEVICE

(71) Applicant: Siemens Aktiengesellschaft, Munich (DE)

(72) Inventors: Ove Boe, Tanem (NO); Thomas Cox, Ulverston (GB); Andreas Gurk, Trondheim (NO); Thomas Ferstad Oevervaag, Trondheim (NO); Eduardo Pimentel Silvestrow, Trondheim (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/444,321

(22) Filed: Jun. 18, 2019

(65) Prior Publication Data
US 2019/0385807 A1    Dec. 19, 2019

(30) Foreign Application Priority Data

Jun. 19, 2018 (EP) .................................. 18178555

(51) Int. Cl.
| | |
|---|---|
| H05K 7/00 | (2006.01) |
| H01H 85/47 | (2006.01) |
| H01H 85/02 | (2006.01) |
| H01H 85/143 | (2006.01) |
| H01H 85/175 | (2006.01) |
| H01H 85/20 | (2006.01) |

(52) U.S. Cl.
CPC ........ H01H 85/47 (2013.01); H01H 85/0241 (2013.01); H01H 85/143 (2013.01); H01H 85/175 (2013.01); H01H 85/205 (2013.01)

(58) Field of Classification Search
USPC .............................. 361/837, 728, 800; 377/1
See application file for complete search history.

(56) References Cited

U.S. PATENT DOCUMENTS

| | | | |
|---|---|---|---|
| 2014/0055227 A1* | 2/2014 | Boe .................... | H01H 85/0026 337/1 |
| 2016/0133422 A1* | 5/2016 | Breili .................. | H01H 85/175 337/204 |
| 2017/0053767 A1* | 2/2017 | Scott .................... | H01H 85/003 |

(Continued)

FOREIGN PATENT DOCUMENTS

| | | |
|---|---|---|
| EP | 2495746 A1 | 9/2012 |
| EP | 2565899 A1 | 3/2013 |
| EP | 2712464 A2 | 4/2014 |

(Continued)

OTHER PUBLICATIONS

Extended European Search Report dated Dec. 6, 2018.

*Primary Examiner* — Hung S. Bui
(74) *Attorney, Agent, or Firm* — Harness, Dickey & Pierce, P.L.C.

(57) ABSTRACT

Example embodiments relate a subsea fuse device exposed to a high ambient pressure when deployed. The fuse device comprises a metallic fuse housing enclosing a low-pressure hollow space and a fuse arranged in the low-pressure hollow space, the fuse having two electrical connectors, wherein one of the electrical connectors of the fuse is electrically and thermoconductively coupled to the metallic fuse housing so as to provide an electrical connection between the fuse connector and the housing and to dissipate heat from the fuse.

18 Claims, 2 Drawing Sheets

(56) References Cited

U.S. PATENT DOCUMENTS

2017/0365433 A1\* 12/2017 Hadler-Jacobsen ........................ H01H 85/175

FOREIGN PATENT DOCUMENTS

| EP | 3179489 A1 | 6/2017 |
|----|---|---|
| EP | 3182438 A1 | 6/2017 |
| WO | WO 2017/153097 | 9/2017 |
| WO | WO-2018/141433 A1 | 8/2018 |

\* cited by examiner

SUBSEA FUSE DEVICE

PRIORITY STATEMENT

The present application hereby claims priority under 35 U.S.C. § 119 to European patent application number EP 18178555.1 filed Jun. 19, 2018, the entire contents of which are hereby incorporated herein by reference.

FIELD

At least some example embodiments relate to a subsea fuse device which may be used in electrical and electronic circuits in subsea equipment such as a subsea device comprising an electric circuitry comprising such subsea fuse device.

BACKGROUND

In subsea applications, for example subsea oil production, subsea devices may comprise electric and electronic circuitry. The subsea devices, which may comprise for example so-called subsea canisters, may be arranged at depths of several hundred or even several thousand meters, for example at a depth of 3000 m. Subsea devices may be pressure compensated such that the inside pressure essentially corresponds to an environmental pressure which may be in a range of a several hundred bars, for example 300 bars at 3000 m. Such pressure compensated subsea devices may be filled with a fluid, for example oil, which may be pressurized at the ambient pressure. Consequently, the very high ambient pressure is also acting on the electric or electronic circuitry arranged within the subsea device.

In electronic and electrical circuitry, fuses are used to protect components or (sub-) circuits from overloads and short circuits. Commonly used disposable fuse arrangements comprise a conductive element which will melt or vaporize if (for example in case of a fault) the current flow in the conductive element exceeds a predefined value.

Co-pending international application WO2017/153097 discloses a fuse device for a pressure-compensated subsea device wherein the fuse device comprises a housing which allows the fuse's conductive element to be arranged inside the housing at much lower pressures (for example 0-2 bar) than present in the pressure-compensated device (for example 300 bar). The design disclosed in WO2017/153097 works with glass housings in which case the subsea fuse device may be manufactured as follows. The fuse wire may be passed through the opposite ends of a glass tube such that the central section is arranged within the glass tube and a first end section and a second end section of the fuse wire are arranged at the opposite ends of the glass tube. The ends of the glass tube are heated to melting point so as to form seals around the first and second end sections, respectively.

Co-pending international application PCT/EP2017/080187 proposes a fuse design wherein the fuse housing comprises a pressure-resistant outer envelope made of an isolating material enclosing a low-pressure hollow space, a first metalized feedthrough, and a second metalized feedthrough which is electrically isolated from the first feedthrough by the outer envelope.

SUMMARY

By melting or vaporizing a conductive element, the fuse becomes not conducting and isolates the component or (sub-) circuit from the rest of the circuitry or system.

Using off-the-shelf fuses in pressure-compensated subsea devices is prohibitive for at least two reasons. Firstly, trials have shown that fuses fail to reliably melt or vaporize when immersed in oil at high ambient pressures. And secondly, the oil is typically used as an isolating fluid and would be contaminated and become conductive by the melted or vaporized residue of the conductive element of the fuse.

The inventors discovered a need for a fuse which operates reliably in an oil-filled subsea device at high pressures.

It has been found that the heating process in WO 2017/153097 may damage the conductive element of the fuse or alter its characteristics so that the conductive element may melt or vaporize at a lower or higher current than the predetermined maximum current.

Both WO2017/153097 and PCT/EP2017/080187 disclose fuses specially designed for the subsea environment which are more expensive to manufacture than off-the-shelf fuses. Additionally such custom fuses require extensive reliability testing which standard, off-the-shelf fuses designed to operate at the surface have already undergone.

Therefore, at least one example embodiment provides a subsea fuse device which facilitates the use of standard, commercially available fuses in the high pressure subsea environment.

At least one example embodiment provides a subsea fuse device including a metallic fuse housing enclosing a low-pressure hollow space; and a fuse arranged in the low-pressure hollow space, the fuse having two electrical connectors, wherein one of the electrical connectors of the fuse is electrically and thermoconductively coupled to the metallic fuse housing so as to provide an electrical connection between the fuse connector and the housing and to dissipate heat from the fuse.

Although specific features are described in the above summary and the following detailed description in connection with specific embodiments, it is to be understood that the features of the embodiments and aspects may be combined with each other unless specifically noted otherwise.

BRIEF DESCRIPTION OF THE DRAWINGS

The following drawings only aim at giving an illustrative description and explanation of the present application, but not limiting the scope of the present application. In the drawings.

DETAILED DESCRIPTION OF EXAMPLE EMBODIMENTS

Figure 1:
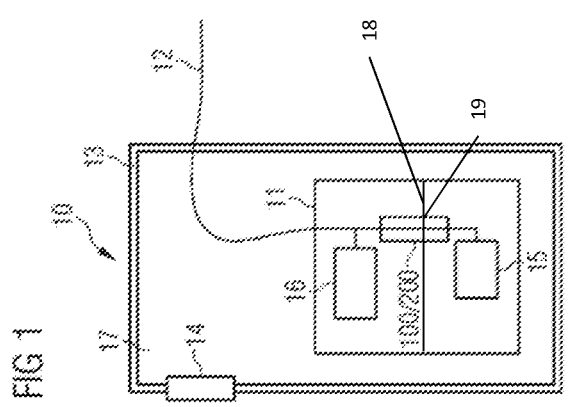
FIG. 1 shows a schematic representation of a subsea device according to an embodiment.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. Example embodiments, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Example embodiments may, however, be embodied in many alternate forms and should not be construed as limited to only the embodiments set forth herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the processing circuitry may be configured to execute the processor executable instructions.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

In accordance with example embodiments there is provided a subsea fuse device exposed to a high ambient pressure when deployed, comprising a pressure resistant metallic fuse housing enclosing a low-pressure hollow space and a fuse arranged in the low-pressure hollow space, the fuse having two electrical connectors, wherein one of the electrical connectors of the fuse is electrically and thermo-conductively coupled to the metallic fuse housing so as to provide an electrical connection between the fuse connector and the housing and to dissipate heat from the fuse.

Coupling one of the fuse connectors directly to the housing provides the advantage that for this connector no pressure-resistant feedthrough is required in order to maintain the low pressure in the hollow space, which is a prerequisite for using fuses designed for surface use. The coupling may be via a contact spring between housing and fuse connector. The thermoconductive coupling solves thermal problems that may arise when a fuse designed for surface use is deployed in a housing where there is no (forced) air movement to cool the fuse. The heat generated by the current passing through the fuse is at least partially dissipated through the thermoconductive coupling between fuse and housing.

Furthermore, such direct coupling may have a smaller impact in terms of inductance than a double feedthrough design and is easier to assemble. It is more cost-efficient, allows for a smaller subsea fuse device and has a higher reliability because one failure-prone feedthrough can be omitted.

In some example embodiments for the electrical connector of the fuse that is not in electrical contact with the metallic fuse housing there is provided an electrical feedthrough comprising a feedthrough connector traversing the metallic fuse housing, wherein the feedthrough is pressure-tight and wherein the feedthrough connector is electrically isolated from the metallic fuse housing. As discussed above, only one such feedthrough will be used, reducing the cost and increasing the reliability of the fuse device, noting that the feedthrough will in practice often pass a barrier between an oil-filled and pressure-compensated region outside the fuse device and the low-pressure space which holds the fuse and is not filled with oil.

Two example housing shapes are: cylindrical shape because a cylinder provides pressure resistance for a given wall strength, and an essentially cuboid shape for mounting the subsea fuse device in corresponding recesses in a busbar which may be mounted on top of a subsea device such as a subsea capacitor. The cylindrical or cuboid pot shape is, provided the wall strength is sufficient, pressure and liquid tight at one end and a feedthrough opening is provided at the other end.

In accordance with some example embodiments there is also provided a subsea device comprising an enclosure and an electric circuitry arranged within the enclosure, wherein the electric circuitry comprises a subsea fuse device according to example embodiments.

The enclosure of the subsea device may be filled with a fluid and comprise a volume/pressure compensator which balances the pressure inside the enclosure to the pressure prevailing in an environment outside of the enclosure. The fluid may be oil or another dielectric fluid.

The at least one electrical feedthrough connector of the fuse device may be exposed to the fluid.

The electric circuitry may in embodiments comprise a subsea capacitor, the subsea capacitor having a busbar, the busbar having at least one recess commensurate with the outer shape of the subsea fuse device, and wherein the subsea fuse device is mounted in the at least one recess.

In such an example embodiment the additional space required by the subsea fuse device may be reduced because at least part of the fuse device will be integrally mounted with the busbar.

In some example embodiments, the mounting of the subsea fuse device in the recess of the busbar may be such (for example by providing contact springs at the recess edges) that the metallic housing of the fuse device enhances the conductance of the busbar across the recess. Thereby the reduced conductance of the busbar caused by the reduced profile caused by the recess can at least partially be compensated.

It should be noted that because the metallic contact surface of the fuse is coupled to the metallic fuse housing and depending on where the fuse device is arranged in the circuitry, the fuse housing may be voltage carrying. If deployed in a dielectric (i.e. electrically isolating) fluid isolating the voltage-carrying fuse housing, additional measures for isolating the voltage-carrying housing from other components may advantageously not be used.

The metallic fuse housing is pressure resistant which means that in a sealed state the pressure inside the hollow space of the fuse housing is independent from an environmental pressure prevailing outside the fuse housing. For example, the pressure inside the fuse housing may be 0-10 bars and preferably 0-20 bars independent of an outside pressure which (upon deployment of the fuse) may be in a range from 50 to several hundred bars. The subsea fuse device according to example embodiments can advantageously provide the same precision and reliability at any depth and may be deployed in installations which are, unlike surface installations, practically inaccessible to routine maintenance. Advantageously, the subsea fuse device may comprise any fuse designed and reliability-tested for surface use and all that needs to be tested for the subsea deployment is the pressure resistance of the fuse housing.

The hollow space may be evacuated or contain any medium, including: gasses such as air, nitrogen or SF6; liquids; gels such as silicone; solid materials such as sand.

The housing described above may also accommodate any custom fuse specially designed for subsea conditions.

FIG. 1 shows a subsea device 10, for example a subsea canister, which may be arranged in a subsea environment for housing electrical components or electric circuitry 11. For communicating with other components arranged in other subsea devices and for supplying the electric circuitry 11 with electrical energy, a data and energy supply connection 12 may be provided extending from an interior of the subsea device 10 to an exterior of the subsea device 10. The subsea device 10 may be arranged and operated in deepwater environments, for example at a depth of 3000 m. Subsea device 10 comprises an enclosure 13 which protects the interior of the enclosure 13 from the environment, for example from salt water.

For the construction of such subsea devices two examples to account for the high pressures present in deep sea environments are described. In a first example solution, a solid pressure resistant outer enclosure is provided for shielding the interior from the high pressure. The interior will then be at a much lower pressure, for example at atmospheric pressure, to facilitate use of electric and electronic components designed for surface use without additional measures. Such enclosures have a minimum wall strength in order to withstand high differential pressures.

In a second example design as shown in FIG. 1, pressurized (or pressure compensated) enclosures 13 are used which comprise a volume/pressure compensator 14 for balancing the pressure in the enclosure to the pressure prevailing in the ambient seawater. The pressure compensated enclosure 13 is generally filled with a fluid 17, usually oil because it is a good thermal conductor, incompressible (as all liquids), and electrically isolating so that electrical components in the enclosure need not be isolated. Pressure/volume compensator 14 compensates variations in the volume of fluid 17 filling enclosure 13 which may occur due to variations in ambient pressure or in temperature. Temperature changes can be caused by deployment at the subsea location or by internal heating, for example due to electric losses.

One of the key challenges with this design is that each component within pressure compensated enclosure 13 is operable under high pressures.

Electric circuitry 11 may comprise electric components 15 and 16 including, but not limited to, sub-circuits and capacitors. Some of the components 15, 16 may be protected from overload and/or short circuits. Therefore, in the power supply connection 12 to the component 15, a subsea fuse device 100/200 is provided. Electric circuitry 11 may include a busbar 18 having a recess 19 within which a metallic housing of subsea fuse device 100/200 may be integrally mounted.

As described above, the interior of enclosure 13 may be filled with a fluid 17, for example dielectric oil. Therefore, the subsea fuse device 100/200, when deployed, is surrounded by and be in direct contact with fluid 17. Furthermore, due to the pressure compensation of enclosure 13 via pressure compensator 14, fluid 17 may be pressurized at essentially the same pressure as prevailing outside of the enclosure 13. In subsea applications this pressure may for example be 300 bars. Therefore subsea fuse device 100/200 has to operate under such pressure conditions.

Figure 2:
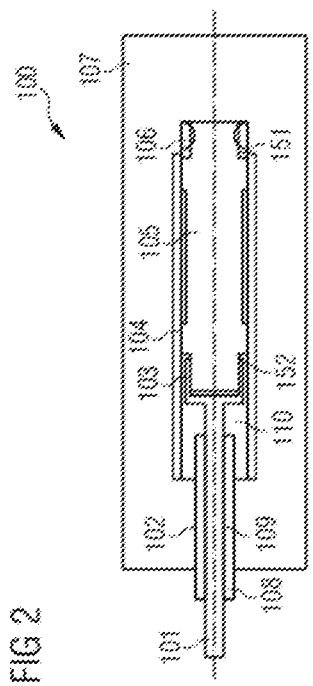
FIGS. 2-3 show schematic representations of subsea fuse devices according to different embodiments.

FIG. 2 shows a first embodiment of a suitable subsea fuse device 100 in more detail. Subsea fuse device 100 comprises a fuse housing 107 which is made of metal and may have a tubular form and be essentially a cylindrical or a cuboid pot.

Fuse housing 107 encloses a hollow space 110 in which a fuse 105 is arranged, for example a standard fuse designed for use at surface conditions.

A first connector or terminal 151 of fuse 105 is in direct contact with housing 107, in embodiments via one or multiple contact spring(s) 106, thereby achieving electrical and thermoconductive coupling between the first terminal and the housing. The first terminal 151 is arranged at the closed end of the pot-shaped or otherwise closed housing. The housing may be solid at that end in order to improve the heat dissipation and structural stability. In other embodiments the fuse housing may essentially be a solid structure with essentially a blind bore to accommodate the fuse 105 and other elements as will be explained below.

The fuses' second terminal 152 is connected to a feedthrough connector 101 which is a conductor penetrating, and extending beyond, the fuse housing 107. At the end inside the fuse housing connector 101 it is attached to or comprises a device 103 shaped to receive the second fuse terminal 152.

A first isolator 108 surrounds the electrical feedthrough connector 101. A first pressure tight sealing 109 is provided between isolator 108 and electrical feedthrough connector 101. A second pressure tight sealing 102 is provided between isolator 108 and housing 107.

A second isolator 104 surrounds the fuse to provide isolation between the fuse housing 107 and the arrangement comprising the second fuse terminal 152, the connector 101 and the device 103.

The fuse housing may comprise two portions such that there is a first portion designed for receiving the fuse and another portion in which the feedthrough assembly comprising connector 101, sealings 102 and 109 and isolator 108 is pre-fabricated. Advantageously, the feedthrough assembly may then have a smaller diameter than the fuse. The fuse and the second isolator are inserted into the first housing portion before the second housing portion is joined with the first housing portion. The joint (not shown) may for example be a treaded joint or a press fit joint comprising pressure-tight gaskets.

Figure 3:
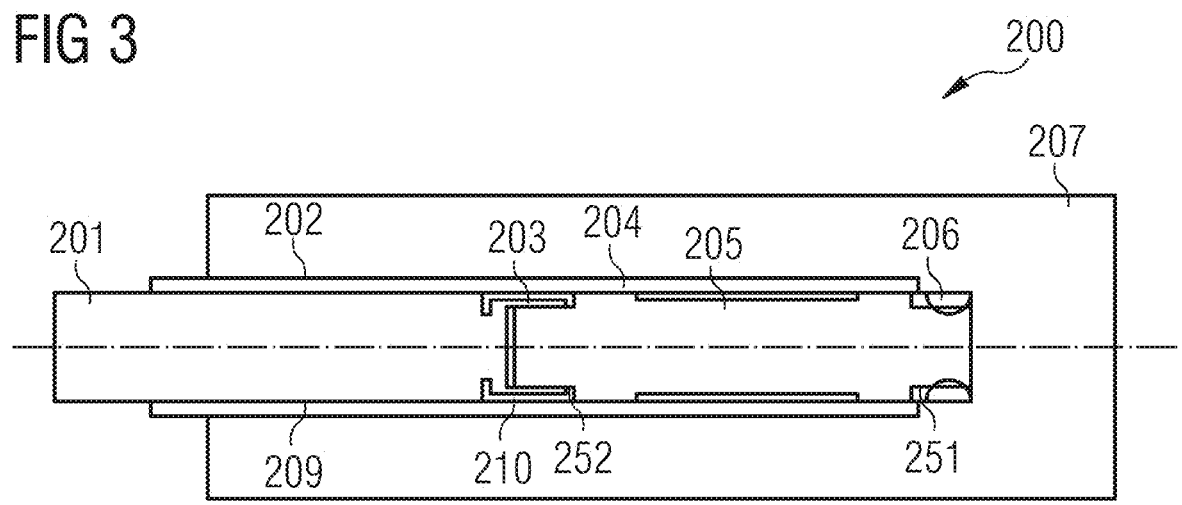

FIG. 3 shows a second embodiment of a suitable subsea fuse device 200 in more detail. Subsea fuse device 200 comprises a fuse housing 207 which is made of metal and may have a tubular form and preferably be essentially a cylindrical or cuboid pot.

Fuse housing 207 encloses a hollow space 210 in which a fuse 205 is arranged, for example a standard fuse designed for use at surface conditions.

A first terminal 251 of fuse 205 is in direct contact with housing 207, in embodiments via one or more contact spring(s) 206, thereby achieving electrical and thermoconductive coupling between the first terminal 251 and the housing. The first terminal 251 is arranged at the closed end of the pot-shaped or otherwise closed housing 207. The housing may be solid at that end in order to improve the heat dissipation and structural stability. In other embodiments the fuse housing may essentially be a solid structure with essentially a blind bore to accommodate the fuse 205 and other elements as will be explained below.

The fuses' second terminal 252 is connected to a feedthrough connector 201 which is a conductor penetrating, and extending beyond, the fuse housing 207. At the end inside the fuse housing connector 201 it is attached to or comprises a device 203 shaped to receive the fuse second terminal 252.

An isolator 204 surrounds the electrical feedthrough 201 and at least part of the fuse to provide isolation between the second terminal 252 and the fuse housing 207. A first pressure tight sealing 209 is provided between isolator 204 and electrical feedthrough connector 201. A second pressure tight sealing 202 is provided between isolator 204 and housing 207.

The fuse housing may again comprise two portions as described with reference to FIG. 2. Preferably however the fuse housing 207 is a one-piece solid cylinder or cuboid with a blind bore into which the fuse 205 wherein the insulation 204 and the feedthrough connector 201 are installed such that pressure tight sealings 202 and 209 are created. Preferably the body of fuse 205 and the feedthrough connector 201 have essentially the same outer diameter.

Subsea fuse device 100, 200 enables the isolation of a faulty component 15 in an oil-filled and pressurized environment. However subsea fuse device 100, 200 may also be used for other types of subsea devices. The subsea fuse device 100, 200 prevents and/or reduces contaminations of the oil in case of breaking of the fuse. It may also help avoiding a total failure of larger systems because well-tested surface fuses may be employed which are proven to reliably break as intended, in particular in subsea devices which are often placed in high ambient pressure environments which are inaccessible, for example at the seabed, and which may make maintenance difficult and expensive.

While example embodiments are described for deepwater subsea applications it may of course also be applied in systems where the pressure difference is smaller.

The invention claimed is:

1. A subsea fuse device comprising:
a metallic fuse housing enclosing a low-pressure hollow space; and
a fuse arranged in the low-pressure hollow space, the fuse having two electrical connectors, wherein one of the electrical connectors of the fuse is electrically and thermoconductively coupled to the metallic fuse housing so as to provide an electrical connection between the fuse connector and the housing and to dissipate heat from the fuse,
wherein the metallic fuse housing is adapted to be integrally mounted in a recess of a busbar of electric circuitry of a subsea device.

2. The subsea fuse device of claim 1, wherein the electrical connector of the fuse that is not in electrical contact with the metallic fuse housing includes an electrical feedthrough comprising a feedthrough connector traversing the metallic fuse housing, wherein the feedthrough is pressure-tight and wherein the feedthrough connector is electrically isolated from the metallic fuse housing.

3. The subsea fuse device of claim 2, wherein the metallic fuse housing comprises an essentially cylindrical pot.

4. The subsea fuse device of claim 2, wherein the metallic fuse housing comprises an essentially cuboid pot.

5. A subsea device, comprising:
an enclosure and the electric circuitry arranged within the enclosure, wherein the electric circuitry comprises the subsea fuse device according to claim 2.

6. The subsea fuse device of claim 1, wherein the metallic fuse housing comprises an essentially cylindrical pot.

7. A subsea device, comprising:
an enclosure and the electric circuitry arranged within the enclosure, wherein the electric circuitry comprises the subsea fuse device according to claim 6.

8. The subsea fuse device of claim 1, wherein the metallic fuse housing comprises an essentially cuboid pot.

9. A subsea device, comprising:
an enclosure and the electric circuitry arranged within the enclosure, wherein the electric circuitry comprises the subsea fuse device according to claim 8.

10. A subsea device, comprising:
an enclosure and the electric circuitry arranged within the enclosure, wherein the electric circuitry comprises the subsea fuse device according to claim 1.

11. The subsea device of claim 10, wherein the enclosure is filled with a fluid and comprises a volume/pressure compensator which balances the pressure inside the enclosure to the pressure prevailing in an environment outside of the enclosure.

12. The subsea device of claim 11, wherein at least one electrical feedthrough connector of the fuse is exposed to the fluid.

13. A subsea device, comprising:
an enclosure and electric circuitry arranged within the enclosure, wherein the electric circuitry includes,
   a subsea fuse device, the subsea fuse device including
      a metallic fuse housing enclosing a low-pressure hollow space, and
      a fuse arranged in the low-pressure hollow space, the fuse having two electrical connectors, wherein one of the electrical connectors of the fuse is electrically and thermoconductively coupled to the metallic fuse housing so as to provide an electrical connection between the fuse connector and the housing and to dissipate heat from the fuse, and
   wherein the electric circuitry comprises a subsea capacitor, the subsea capacitor having a busbar, the busbar having at least one recess commensurate with an outer shape of the subsea fuse device, and wherein the subsea fuse device is mounted in the at least one recess.

14. The subsea device of claim 13, wherein the mounting of the subsea fuse device in the at least one recess of the busbar is such that the metallic housing of the fuse device enhances conductance of the busbar across the at least one recess.

15. A subsea fuse device comprising:
a metallic fuse housing enclosing a low-pressure hollow space; and
a fuse arranged in the low-pressure hollow space, the fuse having two electrical connectors, wherein
one of the electrical connectors of the fuse is directly electrically and thermoconductively coupled to the metallic fuse housing so as to provide an electrical connection between the fuse connector and the housing and to dissipate heat from the fuse, and
the other electrical connector includes a pressure resistant feedthrough.

16. The subsea fuse device of claim 15, wherein the metallic fuse housing is adapted to be integrally mounted in a recess of a busbar of electric circuitry of a subsea device.

17. The subsea fuse device of claim 15, wherein the metallic fuse housing comprises an essentially cylindrical pot.

18. The subsea fuse device of claim 15, wherein the metallic fuse housing comprises an essentially cuboid pot.

* * * * *